United States Patent [19]

Jackson et al.

[11] Patent Number: 5,328,881

[45] Date of Patent: * Jul. 12, 1994

[54] POLYMERIZATION CATALYST AND PROCESS

[75] Inventors: Margie F. Jackson, Ochelata; Ronald D. Knudsen; Joseph S. Shveima, both of Bartlesville, all of Okla.

[73] Assignee: Phillips Petroleum Company, Bartlesville, Okla.

[*] Notice: The portion of the term of this patent subsequent to Mar. 30, 2010 has been disclaimed.

[21] Appl. No.: 962,564

[22] Filed: Oct. 19, 1992

Related U.S. Application Data

[62] Division of Ser. No. 808,128, Dec. 16, 1991, Pat. No. 5,198,512.

[51] Int. Cl.$^5$ .......................... B01J 21/16; B01J 31/00
[52] U.S. Cl. .......................................... 502/80; 502/62; 502/155; 502/167
[58] Field of Search .................... 502/62, 80, 155, 167

[56] References Cited

U.S. PATENT DOCUMENTS

| | | | |
|---|---|---|---|
| 3,620,981 | 11/1971 | Magoon et al. | 252/429 R |
| 3,644,564 | 2/1972 | Zwet et al. | 260/683.15 D |
| 3,647,915 | 3/1972 | Bauer et al. | 260/683.15 D |
| 3,904,550 | 9/1975 | Pine | 252/437 |
| 3,907,923 | 9/1975 | Yoo | 260/683.15 D |
| 4,024,202 | 5/1977 | Burnham | 260/683.15 D |
| 4,482,640 | 11/1984 | Knudsen et al. | 502/155 |
| 4,620,021 | 10/1986 | Starzewski et al. | 556/19 |
| 4,628,138 | 12/1986 | Barnett et al. | 585/531 |

FOREIGN PATENT DOCUMENTS 0381495 4/1985 European Pat. Off.
0137389 8/1990 European Pat. Off.

*Primary Examiner*—Helen M. S. Sneed
*Assistant Examiner*—E. D. Irzinski
*Attorney, Agent, or Firm*—Carl D. Corvin

[57] ABSTRACT

A composition of matter is provided comprising a catalytic mixture resulting from contacting at least one of each of the following compounds, an pyridine compound, a clay compound, and an organo-nickel compound. Additionally, a process is provided comprising contacting, under polymerization conditions, at least one alpha-olefin, with a catalytic mixture resulting from contacting at least one of each of the following compounds, an pyridine compound, a clay compound, and an organo-nickel compound.

14 Claims, No Drawings

POLYMERIZATION CATALYST AND PROCESS

CROSS-REFERENCES TO RELATED APPLICATION

This application is a divisional of application 07/808,128, which was filed Dec. 16, 1991 now U.S. Pat. No. 5,198,512, the entire disclosure of which is hereby incorporated by reference.

BACKGROUND OF THE INVENTION

This invention relates to the field of alpha-olefin polymerization.

Various polymerization processes are known in the art. For example, both chromium and titanium catalyst systems are known to polymerize ethylene. However, even these two popular polymerization systems do not provide solutions to all consumer demands. Consequently, research has been conducted to find new and better polymerization schemes.

One of the important polymer properties is the molecular weight of the polymer. For example, the molecular weight of polyethylene can influence the following properties of the resin: tensile strength; tear strength; low temperature toughness; softening temperature; impact strength; environmental stress crack resistance; melt fluidity; and melt drawability. Consequently, methods are constantly sought which would provide a means to control the molecular weight of a polyolefin.

SUMMARY OF THE INVENTION

It is an object of this invention to provide an improved polymerization process.

It is another object of this invention to provide an improved polymerization process which provides an improved molecular weight control.

It is still another object of this invention to provide an improved catalyst system.

It is still yet another object of this invention to provide an improved catalyst system which provides improved molecular weight control.

In accordance with this invention a composition of matter is provided comprising a catalytic mixture resulting from contacting at least one of each of the following compounds, an pyridine compound, a clay compound, and an organo-nickel compound.

In another embodiment of this invention a process is provided comprising contacting, under polymerization conditions, at least one alpha-olefin, with a catalytic mixture resulting from contacting at least one of each of the following compounds, an pyridine compound, a clay compound, and an organo-nickel.

DETAILED DESCRIPTIONS OF THE INVENTION

Pyridine Compounds

The pyridine compounds useful in this invention are those compounds which are characterized by the following formula:

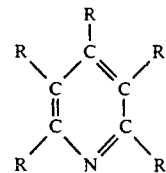

wherein each R is independently selected from the group consisting of Hydrogen and —COOH, provided that at least one R is a —COOH group. Examples of suitable compounds include, but are not limited to, pyridine-2-carboxylic acid (also known as picolinic acid), pyridine-3-carboxylic acid (also known as nicotinic acid), pyridine-4-carboxylic acid, pyridine-2,4-dicarboxylic acid, pyridine-2,5-dicarboxylic acid and pyridine-2,4,6-tricarboxylic acid. Preferred compounds are the mono-pyridine carboxylic acids and most preferred is pyridine-2-carboxylic acid.

The molar ratio of acid compound to nickel should initially be in the range of about 0.01 to about 2. Preferably the molar ratio of acid compound to nickel is in the range of about 0.25 to about 1.75 and most preferably it is in the range of 0.5 to 1.5 inclusive. These ranges during the initially contacting of the catalyst reactants are important because of the resulting complex reactions after contacting.

Clay Compounds

Various clays can help form a polymer of high molecular weight. The initial weight ratio of the clay compound to nickel is generally in the range of about 1 to about 500. Preferably the weight ratio of clay compound to nickel is in the range of about 10 to about 300 and most preferably it is in the range of 25 to 200 inclusive. These ranges during the initial contacting of the catalyst reactants are important because of the resulting complex reactions after contacting and because of various economic and polymer considerations.

General classes of clay compounds useful in this invention are aluminum silicates, magnesium silicates, or aluminum-magnesium silicates. Examples of suitable clay compounds useful in this invention include, but are not limited to:

(1) attapulgite, an aluminum-magnesium silicate.
(2) bentonite, an aluminum silicate.
(3) halloysite, an aluminum silicate.
(4) hectorite, a magnesium silicate.
(5) kaolinite, an aluminum silicate.
(6) montmorillonite, an aluminum silicate.
(7) pyrophylite, an aluminum silicate.
(8) sepiolite, a magnesium silicate.
(9) talc, a magnesium silicate.
(10) vermiculite, an aluminum-magnesium silicate.

Particularly preferred clay catalyst supports are the magnesium silicates such as sepiolite.

It is preferred that the clay compound be conditioned prior to use. This conditioning comprises subjecting the clay compound to a conditioning temperature in the range of about 200° to about 800° C., preferably about 300° to about 700° C., and most preferably 400° to 600° C. The clay compound should be subjected to this conditioning temperature for a period of about 5 minutes to about 50 hours, preferably about 30 minutes to about 25 hours, and most preferably 1 hour to 10 hours.

Organo-Nickel Compounds

The characteristics of these compounds are as follows. The nickel component of the compound should already be in a zero valence state or it should be able to undergo reduction to a zero valence state, before formation of the active nickel component. The organic component should be an unsaturated, compound. An example of a nickel compound useful in this invention is bis(1,5-cyclooctadiene) nickel (referred to hereafter as $(COD)_2Ni$).

These three components of the catalytic mixture, (pyridine compound, clay compound, and organonickel compound), can be contacted in any order and in any manner known in the art.

Alpha-olefins

The alpha-olefins which can be polymerized by this invention are those alpha-olefins with 2 to about 16 carbon atoms in the molecule. Preferably the alpha-olefin molecules have from 2 to about 12 carbon atoms and most preferably they have 2 to 8 carbon atoms. Furthermore, these alpha-olefins can either be linear or branched. Examples of alpha-olefins suitable for this invention include, but are not limited to, ethylene, propylene, 1-butene, 3-methyl-1-butene, 1-pentene, 3-methyl-1-pentene, 4-methyl-1-pentene, 1-hexene, 3-ethyl-1-hexene, 1-octene, 1-decene. It is also within the scope of this invention to copolymerize any of the above monomers with one of the other monomers.

Polymerization Conditions

The reaction temperature can be in the range of about 0° C. to about 300° C. Preferably the reaction temperature is between about 10° C. and about 200° C. and most preferably it is in the range of 20° C. to 160° C. inclusive. The reaction pressure can be in the range of about 10 psig to about 10000 psig. Preferably it is in the range of about 50 to about 1000 psig and most preferably it is in the range of 100 to 600 psig. The reaction time can be in the range of about 1 minute to about 100 hours. Preferably it is in the range of about 5 minutes to about 50 hours and most preferably it is in the range of 1 to 10 hours.

EXAMPLES

These examples are provided to further assist a person skilled in the art with understanding this invention. The particular reactants, conditions, and the like, are intended to be generally illustrative of this invention and are not meant to be construed as unduly limiting the reasonable scope of this invention.

In each run below, ethylene was contacted with $(COD)_2Ni$, picolinic acid, if used, and either bentonite or sepiolite, if used. The reactions were conducted in a 1 liter, stainless steel, stirred reactor. The reactor's contents were substantially free from oxygen which would have adversely affected the polymerization reaction.

A solvent and either the bentonite or the sepiolite, if used, were added to the reactor first. These components were then briefly stirred after being purged with ethylene. Subsequent to this stirring the $(COD)_2Ni$, and the picolinic acid, if used, were added to the reactor. The chemicals in the reactor were then stirred for about 15 minutes. Ethylene was then pressured into the reactor along with a comonomer, if used. The ethylene pressure was then maintained at a nearly constant pressure. The reactions were then terminated by venting the excess ethylene. Any resulting solid material was then separated and recovered. In general, the recovered solid was washed in toluene and/or methanol and then dried and weighed. Thereafter, the characteristics of the solid material were determined.

The results are presented in Tables I-A, I-B, I-C, I-D and I-E. The run numbers in each table refer to the same run (i.e. run 1 in Table I-A, is also run 1 in Table I-B).

TABLE I-A

| | Polymerization Conditions | | | | |
|---|---|---|---|---|---|
| Run Number | Solvent | Amount of Solvent[a] | Reaction Time[b] | Ethylene Pressure Range[c] | Reactor Temperature Range[d] |
| 1 | isobutane | 1000 | 3.61 | 485 → 515 | 25.4 → 33.8 |
| 2 | toluene | 350 | 2.13 | 480 → 500 | 22.4 → 106 |
| 3 | toluene | 350 | 4.97 | 490 → 500 | 20.9 → 38.7 |
| 4 | toluene | 350 | 1.13 | 300 → 500 | 22.6 → 157.8 |
| 5 | toluene | 350 | 2.04 | 490 → 495 | 25.1 → 37.3 |
| 6 | n-heptane | 350 | 7.78 | 485 → 495 | 23.0 → 36.1 |
| 7 | isobutane | 1000 | 2.24 | 480 → 505 | 25.5 → 36.5 |
| 8 | isobutane toluene | 800 150 | 2.36 | 480 → 495 | 27.0 → 42.7 |
| 9[e] | toluene | 350 | 2.06 | 480 → 490 | 25.8 → 41.2 |
| 10[f] | isobutane | 1000 | 3.81 | 480 → 505 | 29.4 → 33.6 |
| 11[f] | toluene | 350 | 2.40 | 185 → 200 | 22.5 → 29.6 |
| 12 | isobutane | 1000 | 2.44 | 490 → 505 | 23.3 → 31.3 |
| 13 | toluene | 350 | 3.11 | 490 → 495 | 22.9 → 34.3 |
| 14 | toluene | 350 | 1.63 | 490 → 500 | 19.0 → 32.5 |

[a] In milliliters.
[b] In hours.
[c] In psig.
[d] In °C.
[e] 100 mL of 1-hexene was added to reactor prior to charging the reactor with ethylene.
[f] 100 mL of 1-hexene was added to reactor as ethylene was charged to reactor.

TABLE I-B

| | Catalyst System Components | | |
|---|---|---|---|
| Run Number | Component 1[a] Type/Amount | Component 2[b] Amount/Calculated[d] Amount of Ni | Component 3[c] Amount |
| 1[d] | S/1.63 | 0.13/0.028 | 0 |
| 2[d] | S/2.66 | 0.22/0.047 | 0.0794 |
| 3[d] | S/3.14 | 0.10/0.021 | 0.0366 |
| 4[e] | B/2.86 | 0.14/0.030 | 0.0347 |
| 5[e] | B/2.38 | 0.06/0.013 | 0.0286 |
| 6[d] | S/1.97 | 0.09/0.019 | 0.0285 |
| 7[d] | S/2.45 | 0.18/0.038 | 0.0806 |
| 8[d] | S/2.32 | 0.13/0.028 | 0.0435 |
| 9[d] | S/2.39 | 0.13/0.028 | 0.0457 |
| 10[d] | S/2.16 | 0.14/0.030 | 0.0631 |
| 11[d] | S/1.90 | 0.11/0.023 | 0.0293 |
| 12[d] | S/3.24 | 0.16/0.034 | 0.0639 |
| 13 | None | 0.41/0.088 | 0.1795 |
| 14 | None | 0.43/0.092 | 0.2043 |

[a] Component 1 was either Bentonite (B), or Sepiloite (S) or none. The amount is in grams.
[b] Component 2 was $(COD)_2Ni$. The amount is in grams. The calculated amount of Ni in Component 2 is also in grams.
[c] Component 3 was Picolinic Acid. The amount is in grams.
[d] The source of the Sepiolite was either Spain (runs 2,3,6,7,9,10,11 and 12) or Kenya (runs 1 and 8). The Sepiolite in runs 1,2,3,8,9,10, and 11 was conditioned by placing it under a nitrogen atmosphere for 1 hour at 500° C. followed by placing it under an earth atmosphere for 3 hours at 600° C. The Sepiolite in run 6,7 and 12 was conditioned by placing it under an earth atmosphere for 3 hours at 600° C.
[e] The source of the Bentonite was Wyoming. The Bentonite was conditioned by placing it under a nitrogen atmosphere for 1 hour at 500° C. then placing it under an earth atmosphere for 3 hours at 500° C.

TABLE I-C

| Run Number | Component 1/ Calculated Amount of Ni[a] | Component 3/ Calculated Amount of Ni[b] |
|---|---|---|
| 1 | 58 | 0 |
| 2 | 57 | 1.7 |
| 3 | 150 | 1.7 |

TABLE I-C-continued

| Run Number | Component 1/ Calculated Amount of Ni[a] | Component 3/ Calculated Amount of Ni[b] |
| --- | --- | --- |
| 4 | 95 | 1.2 |
| 5 | 180 | 2.2 |
| 6 | 100 | 1.5 |
| 7 | 64 | 2.1 |
| 8 | 83 | 1.6 |
| 9 | 85 | 1.6 |
| 10 | 72 | 2.1 |
| 11 | 82 | 1.3 |
| 12 | 95 | 1.9 |
| 13 | 0 | 2.0 |
| 14 | 0 | 2.2 |

[a]This is the ratio of the amount of Component 1 to the calculated amount of Ni in Component 2.
[b]This is the ratio of the amount of Component 3 to the calculated amount of Ni in Component 2.

TABLE I-D

| | Reaction Results | | |
| --- | --- | --- | --- |
| Run Number | Polymer Yield (g) | Time (hours) | Productivity[1] g. polymer/g. Ni/hr. |
| 1 | 0 | 3.61 | NA |
| 2 | 41.3 | 2.13 | 410 |
| 3 | 82.4 | 4.97 | 780 |
| 4 | 41.5 | 1.13 | 1200 |
| 5 | 55.3 | 2.04 | 2100 |
| 6 | 149.5 | 7.78 | 1000 |
| 7 | 103.8 | 2.24 | 1200 |
| 8 | 156.5 | 2.36 | 2400 |
| 9 | 113.5 | 2.06 | 2000 |
| 10 | 3.6 | 3.81 | 32 |
| 11 | 43.7 | 2.40 | 780 |
| 12 | 152.3 | 2.44 | 1800 |
| 13 | 37.6 | 3.11 | 140 |
| 14 | 15.4 | 1.63 | 100 |

[1]Productivity
NA = not applicable

As can be seen from the above, the pyridine compound is very important to the polymerization. This is evidenced by run number one which discloses that without the pyridine compound no polymer was formed. Furthermore, the importance of the clay compound is evidenced by run numbers thirteen and fourteen. In these runs it is evident that without the clay compound very low productivities were obtained. It should be noted that run number ten is considered an abnormal run that is not consistent with this invention.

TABLE I-E

| | Analysis of Polymer | | | |
| --- | --- | --- | --- | --- |
| Run Number | Melt Index[a] | High Load Melt Index[b] | HLMI/MI Ratio | Remarks |
| 1 | NA | NA | NA | R1 |
| 2 | 1.36 | 137.3 | 106 | |
| 3 | 0.41 | 43.5 | 107 | |
| 4 | NA | NA | NA | R4 |
| 5 | 1.44 | 126.0 | 88 | |
| 6 | 0.11 | 16.0 | 198 | |
| 7 | 0.01 | 4.6 | 139 | |
| 8 | 0.07 | 13.3 | 195 | |
| 9 | 0.86 | 81.1 | 94 | |
| 10 | ND | ND | ND | R10 |
| 11 | 1.58 | 163.6 | 104 | |
| 12 | ND | ND | ND | |
| 13 | 4.7 | 8545 | 1818 | |
| 14 | 32.6 | ND | ND | |

ND = not determined
NA = not applicable
[a]Determined in accordance with ASTM-D-1238. Also known as FR 190/2.16.
[b]Determined in accordance with ASTM-D-1238. Also known as FR 190/21.60.
Remarks
R1: No apparent polymer
R4: Waxy solid material
R10: Mainly liquid with some polymer The data in Table I-E discloses that very low melt indexes are achieved with the clay compounds. This is evidenced by runs 2, 3, 5-9, and 11 when compared to runs 13 & 14.

That which is claimed is:

1. A composition of matter comprising a catalytic mixture resulting from contacting:
   at least one pyridine compound having the formula

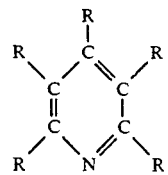

wherein each R is independently selected from the group consisting of hydrogen and —COOH, provided that at least one R group is a —COOH group;
   at least one organo-nickel compound wherein the nickel is in the zero valence state before formation of the active nickel component; and
   at least one clay compound wherein the weight ratio of said clay compound to said nickel is from about 1 to about 400.

2. A catalytic mixture according to claim 1 wherein said pyridine compound is selected from the group consisting of pyridine-2-carboxylic acid, pyridine-3-carboxylic acid, pyridine-1,5-dicarboxylic acid, pyridine-2,4,6-tricarboxylic acid, and mixture of two or more said pyridine compounds.

3. A catalytic mixture according to claim 1 wherein said pyridine compound is pyridine-2-carboxylic acid.

4. A catalytic mixture according to claim 1 wherein the molar ratio of said pyridine compound to nickel is from about 0.01 to about 2.

5. A catalytic mixture according to claim 1 wherein said clay compound is selected from the group consisting of aluminum silicate clays, magnesium silicate clays, aluminum-magnesium silicate clays, and mixtures of two or more of said clay compounds.

6. A catalytic mixture according to claim 1 wherein said clay compound is selected from the group consisting of attapulgite, bentonite, halloysite, hectorite, kaolinite, montmorillonite, pyrophylite, sepiolite, talc, vermiculite, and mixtures of two or more said clay compounds.

7. A catalytic mixture according to claim 1 wherein said clay compound is a magnesium silicate clay.

8. A catalytic mixture according to claim 1 wherein said clay compound is selected from the group consisting of sepiolite, bentonite, and mixtures thereof.

9. A catalytic mixture according to claim 1 wherein said clay compound is sepiolite.

10. A catalytic mixture according to claim 1 wherein said clay compound is bentonite.

11. A catalytic mixture according to claim 1 wherein the weight ratio of clay compound to nickel is from about 10 to about 300.

12. A catalytic mixture according to claim 1 wherein said nickel compound is bis(1,5-cyclooctadiene) nickel.

13. A composition of matter comprising a catalytic mixture resulting from contacting:
 (a) pyridine-2-carboxylic acid;
 (b) bis(1,5-cyclooctadiene) nickel; and
 (c) a clay compound selected from the group consisting of sepiolite, bentonite, and mixtures thereof; wherein the weight ratio of clay compound to nickel is from about 1 to about 500.

14. A catalytic mixture according to claim 13 wherein the molar ratio of said pyridine-2-carboxylic acid to nickel is from about 0.01 to about 2.

* * * * *